United States Patent
Stalony-Dobrzanski

[15] 3,653,975
[45] Apr. 4, 1972

[54] REGENERATIVE THERMOCOUPLE SENSOR

[72] Inventor: Janusz A. Stalony-Dobrzanski, Playa Del Ray, Calif.

[73] Assignee: Northrop Corporation, Beverly Hills, Calif.

[22] Filed: Dec. 13, 1967

[21] Appl. No.: 690,171

[52] U.S. Cl. ............................................. 136/225, 136/230
[51] Int. Cl. ....................................................... H01v 1/02
[58] Field of Search .......................... 136/230–236, 225

[56] References Cited

UNITED STATES PATENTS

| | | | |
|---|---|---|---|
| 1,289,116 | 12/1918 | Chubb | 136/233 |
| 2,588,998 | 3/1952 | Troy et al. | 136/230 |
| 2,870,233 | 1/1959 | Comex | 136/233 |
| 2,978,527 | 4/1961 | Forde | 136/235 |
| 2,997,513 | 8/1961 | Rall et al. | 136/233 |
| 3,006,978 | 10/1961 | McGrath et al. | 136/233 X |
| 3,232,794 | 2/1966 | Korton | 136/233 |
| 3,283,397 | 11/1966 | Beckman | 136/233 X |
| 3,294,592 | 12/1966 | Fish et al. | 136/234 |
| 3,283,580 | 11/1966 | Nanigian et al. | 136/230 X |

FOREIGN PATENTS OR APPLICATIONS

| | | | |
|---|---|---|---|
| 974,070 | 11/1964 | Great Britain | 136/230 |

*Primary Examiner*—Benjamin R. Padgett
*Assistant Examiner*—Harvey E. Behrend
*Attorney*—Harold L. Fox and Willard M. Graham

[57] ABSTRACT

A thermocouple device adapted to regenerate its junction in an ablating environment. The device includes a pair of dissimilar ribbon-like members the ends of which are welded or otherwise secured together. The individual members are folded on themselves in side-by-side non-contacting relation to provide a thermocouple assembly. The assembly—in turn—is imbedded in an ablating or like material. So positioned, ends of the members will reweld themselves as the ablating material melts away. The above feature is a continuous operation, rendering the operation of the device continuous.

1 Claims, 2 Drawing Figures

Patented April 4, 1972

3,653,975

INVENTOR:
JANUSZ A. STALONY-DOBRZANSKI

By Harold L Fox

AGENT

REGENERATIVE THERMOCOUPLE SENSOR

Frequently conditions are encountered in which it is necessary to continuously monitor or sense the surface temperatures of an object. For example, the exposed surface of re-entry vehicles must be continuously monitored or sensed for the safety of the pilot and vehicle and also to obtain trajectory and stabilization data, if a guidance and control system using surface temperatures is to be utilized, in guiding a vehicle to a preselected landing location.

Referring to the above example, temperatures of selected surface locations must be sensed, not only at such times as the temperatures are relatively moderate, but continuously as the temperatures increase to a maximum.

Prior to the present disclosure—the above feature—was difficult to achieve if not impossible. If the temperatures sensing device is located on the surface covering (ablating material) of the vehicle the sensing device will fail to function as the ablating material melts away due to excessively high temperatures.

Briefly the present invention comprises a temperature sensing device of the thermocouple type. The thermocouple element includes a pair of ribbon-type members, one of which is constructed of pure tungsten and the other of tungsten plus 26 percent of rhemium a thin coating of MgO material acting as an insulator surrounding one of the members. The ends of the members are welded together and positioned in an ablating or similar material with the junction on the surface, as positioned the thermocouple members have a side-by-side relation separated only by the coating of MgO. As the surface of the ablating material melts away the ends of the thermocouple members reweld themselves. Thus it can be seen that the thermocouple device will continue to function, throughout the entire time that the ablating material melts away and is therefore referred to as a regenerative thermocouple.

A principal object of the present invention is to provide regenerative thermocouple.

Another object is to provide a thermocouple adapted to function a predetermined time or as long as the thermocouple members are imbeded in an ablating or similar material.

Another object is to provide a thermocouple to operate at extremely high temperatures (up to 6,000° F).

Another object is to provide a thermocouple with a very fast response.

Another object is to provide a thermocouple adapted to function in an oxidizing atmosphere.

Although the characteristic features of the present invention are particularly pointed out in the appended claims, the invention itself, also the manner in which it may be carried out, will be better understood by referring to the following description taken in connection with the accompanying drawings forming a part of this application and in which:

Figure 1:
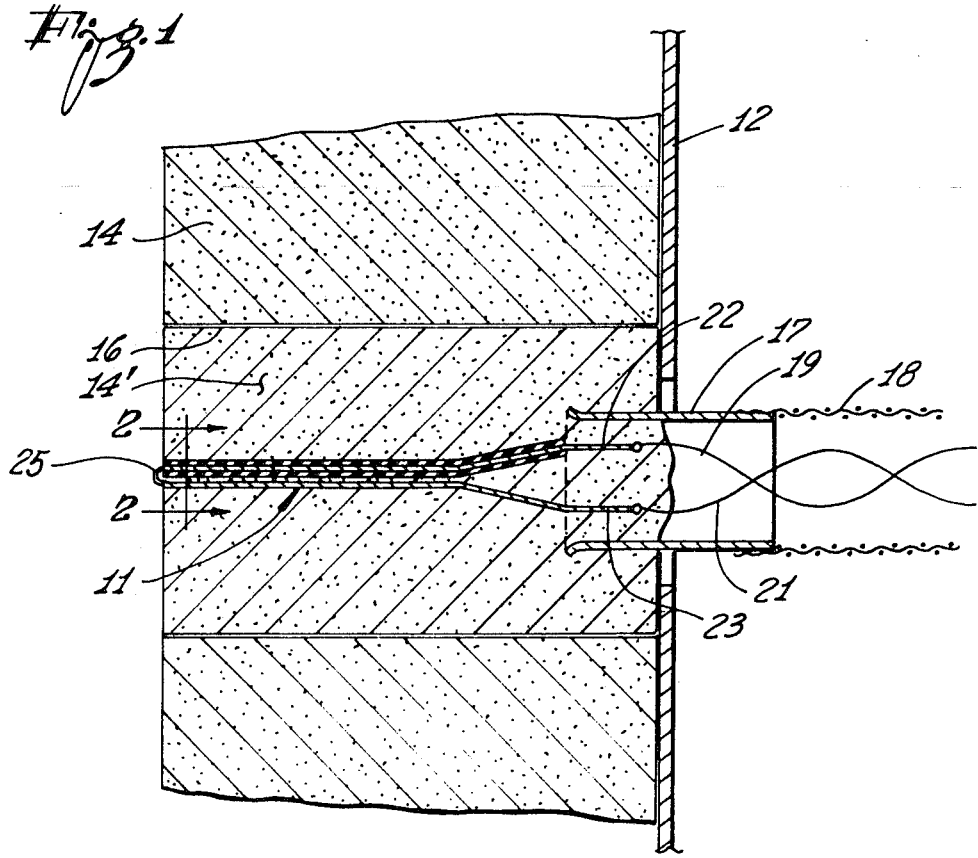
FIG. 1 shows an installation including a thermocouple assembly of the type disclosed herein.
Figure 2:
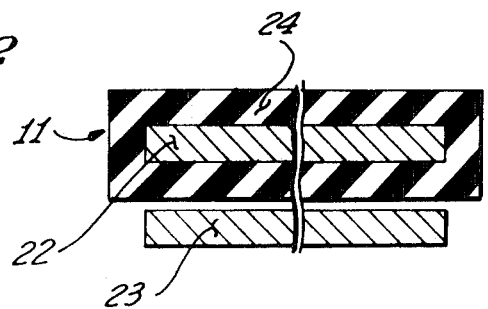
FIG. 2 is a fragmentary sectional view taken on the line 2—2 of FIG. 1, the figure being enlarged to better show the construction thereof.

Referring to the drawing, FIG. 1 shows a thermocouple 11 of the type disclosed herein. In the present embodiment the thermocouple 11 is shown as being utilized to measure surface temperature of a vehicle (not shown). The vehicle is represented by an outside skin or surface 12 carrying an ablating material 14. The ablating material has a passageway 16 formed therein preferably circular in cross-section. While the thermocouple 11 is shown (FIG. 1) as being utilized to measure or sense the surface temperature of a vehicle, it will be understood that it may be used for other purposes and has other applications.

The thermocouple 11 is positioned in a body of ablating material 14' adapted to be received in the passageway 16. The body 14' is adhesively bonded in the passageway 16 so that the bodies 14 and 14' are substantially of unitary construction. A stainless steel tube 17 extends a short distance from the body 14' and through an aperture provided in the skin 12. Secured to the aft end of the tube 17 is braided shielding 18 preferably constructed of stainless steel. The tube and braided wire 17 and 18 provide protection and egress means for the thermocouple leads 19 and 21.

The thermocouple 11 includes a pair of members 22 and 23 constructed of dissimilar metal. In the present embodiment tungsten and tungsten/rhemium were selected, it will be understood, however, that many other metals may be used. Tungsten and tungsten/rhemium were chosen for this particular installation because of their ability to withstand extremely high temperatures, temperatures in excess of 5,000° F.

Physically, the members 22 and 23 have a ribbon-like configuration, one of the members being covered with a coating of insulating material 24. In the present embodiment magnesium oxide is selected for this purpose because of its ability to withstand high temperatures. Also in the present embodiment, specific measurements of the members 22 and 23 are approximately 0.050 inch wide and 0.001 inch thick.

The members 22 and 23 are joined together at their forward ends and folded upon themselves. Because of the coating of magnesium oxide 24 the members 22 and 23 are separated by approximately 0.001 inch. The members 22 and 23 are positioned in the body 14' substantially as shown in FIG. 1, the forward ends of the members 22 and 23 being fused together as indicated by the numeral 25. This junction (hot junction) has a flush relationship with the outer surface of the body 14'.

Various components of the thermocouple 11 having been described, also their relation with the bodies 14 and 14', a better understanding thereof will be forthcoming from the following description of the thermocouple operation.

For purposes of illustration it is assumed that, the bodies 14 and 14' constitute a heat shield of a re-entry vehicle. Further, that the bodies 14 and 14' has the thermocouple 11 mounted therein (FIG. 1) adapted to monitor or sense the surface temperature of the re-entry vehicle. The information thus obtained is utilized to provide trajectory and stabilization of the re-entry vehicle. Systems of the type just described are referred to as Temperature Rate Flight Control Systems (TRFCS).

As the vehicle contacts the atmosphere, the temperature of the vehicle, also the temperature of the surfaces of the bodies 14 and 14', increases. With the relation shown in FIG. 1, the thermocouple 11 is extremely sensitive due to the fact that the hot junction 25 is located in the surface of the ablating material, additional sensitivity is imparted to the thermocouple 11 due to the fact that the members 22 and 23 are not shielded by protective material as in the case in conventional thermocouples. Accordingly it is apparent that at the beginning of a sensing operation, the thermocouple 11 is rendered extremely sensitive for the above reasons.

As the temperature of the re-entry vehicle contacts increasingly dense air, the temperature of the ablating material (bodies 14 and 14') are further increased and ablation of the bodies 14 and 14' increases. Accordingly the hot junction 25 becomes exposed and is burned or melted away. The junction 25, however, is not destroyed, rather the members 22 and 23 continuously fuse themselves together and the thermocouple remains in continuous operation.

Because of this feature (continuous fusing of the junction 24) the thermocouple 11 is referred to as a regenerating thermocouple. The above feature—hot junction located in (flush) relation with the surface of the ablating material at all times renders the thermocouple 11 extremely sensitive and functions to sense minimum changes in temperature with little or no delay. Thus it will be seen a thermocouple providing the many objects and advantages of the invention is provided.

While in order to comply with the statute, the invention has been described in language more or less specific as to structural features, it is to be understood that the invention is not limited to the specific features shown, but that the means and construction herein disclosed comprise the preferred form of putting the invention into effect, and the invention is therefore claimed in any of its forms or modifications within the legitimate and valid scope of the appended claims.

I claim:
1. In a temperature sensing installation the combination comprising:
 a. a body including a portion subject to extremely high temperature;
 b. the outer surface of said portion carrying a body of ablating material defining a substantially plane surface;
 c. a thermocouple assembly including a hot junction, at its mid-point, and a pair of leg members fabricated of dissimilar metals each of ribbon-like configuration including side surfaces and edge portions;
 d. the thermocouple being folded at its mid-point with adjacent side surfaces of said leg members spaced approximately 0.001 inch apart and insulated from each other by a layer of magnesium oxide and having the side surfaces thereof in opposite relation;
 e. said thermocouple being embedded in said body of ablating material with the hot junction thereof original positioned in the outer surface of said ablating material and the legs extending completely through the body of ablating material resulting in the hot junction regenerating itself and rendering the thermocouple continuously operative to sense the temperature of the outer surface of said ablating material.

* * * * *